Patented Nov. 10, 1936

2,060,264

UNITED STATES PATENT OFFICE 2,060,264

SOURING MATERIAL

Freeman R. Swift, Mount Vernon, N. Y., assignor to Standard Brands Incorporated, New York, N. Y., a corporation of Delaware No Drawing. Application September 19, 1931, Serial No. 563,900

16 Claims. (Cl. 99—93)

The invention relates to a material adapted for souring, to a method for its preparation, and to a manner in which the souring material may be utilized. More particularly, the invention relates to a souring material preferably made with rye flour which is especially useful in the preparation of sour rye bread.

It is an object of the invention to provide a souring material which is well adapted for use in the manufacture of a sour dough in bread making and which may be prepared economically in large quantities on a commercial scale.

It is another object of the invention to provide a souring material of uniform quality, flavor and aroma; which may be easily handled and shipped without damage; which possesses good keeping qualities, and which may be utilized by a baker in the preparation of products characterized by a sour or acid condition during manufacture and by a sour taste in the final product.

A further object of the invention is to provide a method for the preparation of the souring material from amylaceous materials that may be economically and readily practiced commercially.

Other objects of the invention will in part be obvious and will in part appear hereinafter.

The invention accordingly comprises the several steps and relation of one or more of such steps with respect to each of the others, and the product possessing the features, properties and the relation of constituents which are exemplified in the following detailed disclosure, and the scope of the invention will be indicated in the claims.

In the practice of the invention a souring material may be prepared through the use of an anaerobic, moderate temperature member of the lactic acid forming group of bacilli. The bacillus may be obtained by taking an amylaceous material, as a flour, and permitting it to sour by standing at ordinary temperatures for several days, or a sour dough prepared in accordance with usual practice, and preparing cultures therefrom. When a considerable number of microorganisms have developed, those bacilli which predominate may be removed with a micro-manipulator or by plating upon a suitable solid medium. The plates are permitted to undergo incubation during which the desired lactic acid bacilli appear in pinhead, subsurface colonies. Tubes containing a suitable wort are then inoculated by a small needle inoculation of these bacilli and the bacilli occasioning the greatest increase in acidity during a given period of time selected.

The bacilli found to have the greatest acid producing power are used to prepare the souring material through admixture of a quantity thereof with an amylaceous material, as a flour. After proper incubation and increase to a desired quantity, the mass may be dried under conditions preventing reduction of activity, such as in an inert atmosphere or substantially in the absence of oxygen without heating, or under reduced pressure, in a suitable drying apparatus. The organism is anaerobic and hence detrimental effects due to the presence of oxygen are to be avoided.

When the material has been dried sufficiently, it may be ground and stored until use is desired to be made of it. The souring material so prepared may then be utilized in the production of a sour baked product, as a sour rye bread, by making, first, a sour dough by mixing a small quantity of the souring material with a flour-water dough and permitting it to incubate for a period of time. The sour dough thus obtained is of uniform quality, and when used, it is incorporated with the remainder of the usual ingredients of a dough batch.

As an illustrative embodiment of a manner in which the invention may be practiced, the following description is presented:

*Preparation of souring material.*—An anaerobic, moderate temperature member of the group of bacilli forming lactic acid may be obtained in any convenient manner, as for example the methods hereinafter given. There may be taken a small amount of a well soured dough or flour-water mixture that has been soured by standing; placing it in a vessel containing a suitable liquid medium, for example a malt wort of 12° Balling and having a pH value of about 4.8 and incubating therein at a temperature of about 30° C. for a period of about 24 hours. At the end of the incubation period a large number of microorganisms will have developed and the desired lactic acid bacillus will predominate.

The desired bacilli may be separated from the medium through the use of a micro-manipulator, or by making a number of high dilutions. A convenient number of the most abundant bacilli appearing in the malt wort are picked out and transferred, each to an individual droplet of clear wort. In these droplets the viability and purity of each is proven and then they are transferred directly to a larger quantity of wort and incubated. When the dilution method is followed, a number of high dilutions of the wort are made into a malt wort containing agar-agar and these are passed into suitable receptacles for plating and incubated.

The lactic acid bacilli of the strain desired develop upon the plates as pin-head, subsurface colonies in from three to four days at a temperature of 30° C. A transfer by means of a platinum needle of the bacilli is then made from the pin-head, subsurface colonies to a malt wort of 12° Balling and 4.8 pH and allowed to grow therein under anaerobic conditions. The desired bacilli are selected according to that which brings about a marked increase in the acidity of the malt wort in from 48 to 72 hours, as for example, an increase in acidity from pH 4.8 to less than pH 3.8. The bacilli so obtained may be used immediately or transferred to a stock medium, for example the above described malt wort, such transfer being made under anaerobic conditions and maintained therein under such conditions until use thereof is desired.

The bacilli prepared in the manner above described are admixed with a flour, as rye flour, and a convenient quantity of water. Thus, 10 parts of the bacilli preparation may be combined with 100 parts of rye flour and 200 parts of water. The admixture is allowed to incubate at a temperature of about 30° C. for a period of about 15 to 18 hours and is then admixed with a quantity of flour and water which is about 40 times the quantity first used. This mixture is now permitted to undergo incubation in the same manner and is then intermingled with a quantity of flour and water which is again about 40 times the quantity in the preceding mixture. The mix thus prepared is permitted to undergo souring and may be increased in the foregoing manner until a batch of desired quantity is made.

The souring material thus prepared is dried in any convenient manner at a low temperature and preferably in the substantial absence of air, or oxygen. This may be accomplished by placing the souring material in a drum drier, or in a tray drier and passing a gaseous current therethrough. The result may be effected also by reducing the pressure thereon, or by a combination of these procedures. The use of increased temperature, especially in the presence of oxygen, detrimentally affects the bacilli. When the material has been dried to a sufficient extent, it is ground and may be suitably packaged and stored in a cool place until it is required for the manufacture of a dough mix, in the making of bread, for example.

*Preparation of a baked product—e. g. bread.—*
The souring material so prepared is incorporated in an amount of about 1 per cent into a flour-water dough and the mass permitted to incubate for a period of from 15 to 18 hours at a temperature of about 30° C. There is thus produced a "sour dough" which is of uniform quality, flavor and aroma and which is capable of being duplicated as desired. A sour dough prepared in this manner from a rye flour-water dough containing 25 per cent of rye flour and 13 per cent water may be admixed with a dough batch for the making of bread including 60 per cent of clear or patent flour, 15 per cent of rye flour, 47 per cent water, 1.5 per cent yeast, 2 per cent salt and .5 per cent shortening. This dough batch may be mixed at a temperature of about 77° F., punched at 45 minutes; benched for about 15 minutes, and baked at a temperature of about 225° C. These percentages are based on the total amount of flour used: i. e. flour constituting 100 per cent.

The foregoing description of a method of procedure, it will be realized, is presented merely for illustrative purposes and that the values for concentration, conditions of acidity, type of amylaceous material, quantities and manner of making the "sour dough" and finished baked product may be varied within considerable limits without departing from the spirit and scope of the invention. Thus, the temperatures of incubation may vary from 20° to 35° C., the degree Balling of the malt wort from 1° to 16°, the pH value of the malt wort from 3.5 to 7.0 and the amylaceous material, in addition to rye flour, may be a flour prepared from wheat, corn, potatoes, etc.

The souring material prepared is of uniform quality, may be handled with ease and is of good keeping quality. Further, it has been found that a sample retains practically its original activity after having been set aside for a period of about seven months at room temperature. If desired, the souring material, after being dried and ground, may be packaged in loose form in any suitable type of package, as cartons, paper sacks, or in vacuum tins and particularly under such conditions that there is a substantial absence of oxygen. Otherwise, however, the souring material may be compressed in the form of cakes, or pellets of a size found to be convenient in its subsequent utilization.

It will be observed that by the method herein outlined there may be prepared as a composition of matter a souring material comprising pure cultured anaerobic, moderate temperature bacilli of the lactic acid forming group admixed with an amylaceous material, as rye flour, which is suitable for the manufacture of baked products, particularly of sour rye bread and, since certain changes in carrying out the above process and certain modifications in the composition which embodies the invention may be made without departing from its scope, it will be understood that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method for the preparation of a dry souring material which comprises admixing pure cultured anaerobic, moderate temperature bacilli of the lactic acid forming group with an amylaceous material and water, allowing the admixture to remain at a temperature of from 20° to 35° C. for a period of time and then drying.

2. A method for the preparation of a dry souring material which comprises admixing pure cultured anaerobic, moderate temperature bacilli of the lactic acid forming group with a flour and water dough, allowing the admixture to remain at a temperature of from 20° to 35° C. for a period of time and then drying in the substantial absence of oxygen.

3. A method for the preparation of a dry souring material which comprises admixing pure cultured anaerobic, moderate temperature bacilli of the lactic acid forming group with rye flour and water, allowing the admixture to remain at a temperature of from 20° to 35° C. for a period of about 15 to 18 hours and then drying in the substantial absence of oxygen.

4. A method for the preparation of a dry souring material which comprises admixing pure cultured anaerobic, moderate temperature bacilli of the lactic acid forming group with rye flour and water, allowing the admixture to remain at a temperature of from 20° to 35° C. for a period of about 15 to 18 hours and then drying in the substantial absence of oxygen without heating.

5. A method for the preparation of a dry souring material which comprises admixing pure cultured anaerobic, moderate temperature bacilli of the lactic acid forming group with rye flour and water, allowing the admixture to remain for a period of about 15 to 18 hours at a temperature of about 30° C., then admixing with a further quantity of rye flour and water and allowing to remain for a similar period of time at a similar temperature and drying without heating in the substantial absence of oxygen.

6. A method for the production of baked products which comprises admixing pure cultured anaerobic, moderate temperature bacilli of the lactic acid forming group with a flour and water dough, allowing the admixture to remain for a period of several hours at a temperature of from 20° to 35° C., drying, then forming a sour dough by admixing with a flour-water dough and incubating for several hours at a temperature of from 20° to 35° C., incorporating the sour dough with a dough batch prepared in the usual manner and including flour, water, yeast and salt; and baking.

7. A method for the production of baked products which comprises admixing pure cultured anaerobic, moderate temperature bacilli of the lactic acid forming group with rye flour and water, allowing the admixture to stand for a period of about 15 to 18 hours at a temperature of about 30° C., drying in the substantial absence of oxygen, incorporating the dried material thus prepared into a rye flour-water dough in an amount of about 1 per cent thereof, incubating for about 15 to 18 hours at a temperature of about 30° C., whereby sour dough is produced, and admixing the sour dough so produced with a rye flour dough batch and baking.

8. A method for the preparation of a dry souring material which comprises admixing one part of pure cultured anaerobic, moderate temperature bacilli of the lactic acid forming group in liquid form with about 10 parts of rye flour and 20 parts of water, allowing to stand about 15 to 18 hours at a temperature of about 30° C., mixing the mass thus obtained with rye flour and water in quantity about 40 times the quantity first used, allowing this mixture to stand for a period of from 15 to 18 hours at a temperature of about 30° C., repeating the procedure and then drying in the substantial absence of oxygen without heating.

9. A method for the preparation of a dry souring material which comprises adding anaerobic, moderate temperature bacilli of the lactic acid forming group to a malt wort of about 1° to 16° Balling and having a pH value of from 3.5 to 7.0, allowing incubation to take place, separating cells of the desired bacillus from the incubated mass, admixing with an amylaceous material and water, allowing the admixture to remain for a period of several hours at a temperature of from 20° to 35° C. and drying.

10. A method for the preparation of a dry souring material which comprises adding anaerobic, moderate temperature bacilli of the lactic acid forming group to a malt wort of about 10° to 16° Balling and having a pH value of from 3.5 to 7.0, allowing the mass to incubate, separating cells of the predominating bacilli, inoculating therewith a solid medium containing a malt wort of 1° to 16° Balling and having a pH value of 3.5 to 7.0 and agar-agar, allowing incubation to take place until pin-head, subsurface colonies are formed at a temperature of from 20° to 35° C., admixing the bacilli with an amylaceous material and water, allowing the admixture to remain for a period of several hours at a temperature of from 20° to 35° C., then mixing with a further quantity of amylaceous material and water and allowing to remain as aforesaid, and drying in the substantial absence of oxygen.

11. A method for the preparation of a dry souring material which comprises adding anaerobic, moderate temperature bacilli of the lactic acid forming group to a malt wort of about 12° Balling and having a pH value of about 4.8, allowing the mass to incubate for about 24 hours at a temperature of about 30° C., separating cells of the predominating bacilli, inoculating therewith a solid medium composed of agar-agar and a malt wort of about 12° Balling and having a pH value of about 4.8, allowing incubation to take place for a period of from 3 to 4 days at a temperature of about 30° C. until pin-head, subsurface colonies are formed, then admixing bacilli capable of reducing the pH value of a 12° Balling malt wort under anaerobic conditions from about 4.8 to less than 3.8 in from 48 to 72 hours with rye flour, allowing the admixture to remain for 15 to 18 hours at a temperature of about 30° C., mixing with a further quantity of rye flour and water and allowing to remain as aforesaid, and drying in the substantial absence of oxygen without heat.

12. As a composition of matter, a dry souring material comprising pure cultured anaerobic, moderate temperature bacilli of the lactic acid forming group and an amylaceous material, said bacilli having an incubating temperature of from 20° to 35° C.

13. As a composition of matter, a dry souring material comprising pure cultured anaerobic, moderate temperature bacilli of the lactic acid forming group and a flour material, said bacilli having an incubating temperature of from 20° to 35° C.

14. As a composition of matter, a dry souring material comprising pure cultured anaerobic, moderate temperature bacilli of the lactic acid forming group and rye flour, said bacilli having an incubating temperature of from 20° to 35° C.

15. As a composition of matter, a dry souring material comprising anaerobic, moderate temperature bacilli of the lactic acid forming group and rye flour in a dry and ground form, said bacilli having an incubating temperature of from 20° to 35° C.

16. As a composition of matter, a dry souring material comprising anaerobic, moderate temperature bacilli of the lactic acid forming group and rye flour in a dry and ground form in the proportions of about 1 part of a liquid culture of the bacilli to about 10 parts of the flour, said bacilli having an incubating temperature of from 20° to 35° C.

FREEMAN R. SWIFT.